Patented Apr. 18, 1950

2,504,098

UNITED STATES PATENT OFFICE 2,504,098

ASYMMETRICAL SULFOLANYL ETHERS OF HETEROCYCLIC ALCOHOLS

Rupert C. Morris, Berkeley, and John L. Van Winkle, San Lorenzo, Calif., assignors to Shell Development Company, San Francisco, Calif., a corporation of Delaware No Drawing. Application October 22, 1945, Serial No. 623,863

10 Claims. (Cl. 260—329)

This invention relates to a novel and particularly useful class of sulfolanyl ethers. More particularly the invention pertains to a novel class of ethers of cyclic sulfones comprising asymmetrical sulfolanyl ethers of heterocyclic alcohols.

It is an object of the present invention to provide a new class of chemical compounds. A further object of the invention is to provide a class of compounds with unexpectedly useful properties. Other objects and advantages of the invention will be apparent from the following detailed description thereof.

The novel compounds of the invention are distinguished from ethers of cyclic sulfones known heretofore in that they comprise asymmetrical sulfolanyl ethers having an organic group containing a heterocyclic radical connected by an ether oxygen atom to a sulfolanyl radical. It has been found that the novel asymmetrical compounds possess novel and particularly useful properties, attributable to the presence of the heterocyclic group, which enable the utilization of these compounds in fields of application in which the ethers of cyclic sulfones available heretofore have either been inapplicable or lacking in providing to a sufficient degree the functions demanded of them. Thus the properties possessed to a peculiar degree by the compounds of the invention render them of particular value in the production of synthetic rubbers, resins and other highly polymeric substances. Their effectiveness as plasticizing agents, softening agents, and modifying agents for such polymeric materials render them of particular value as additives to these materials in the production, compounding, processing or treatment thereof. Among other fields of application are their use as components in the production of insecticidal and fungicidal compositions, solvents and extractants, addition agents in the production of films, coatings, varnishes, paints, lacquers, etc. The novel asymmetrical sulfolanyl ethers are a particularly useful class of compounds which may be used for the synthesis of various compounds owing to the presence of the heterocyclic group as well as the sulfonyl group in these compounds. They are especially suited for the preparation of various pharmaceutical and medicinal compounds and compositions.

The novel compounds of the invention comprise broadly the sulfolanyl asymmetrical sulfolanyl ethers wherein an organic radical containing a heterocyclic group and a sulfolanyl radical are attached to the same oxygen atom.

The cyclic sulfones, to novel ethers of which the present invention is directed, comprise those wherein the nuclear carbon atoms are saturated as well as those wherein at least two of the nuclear carbon atom are connected by means of an olefinic double bond. These saturated cyclic sulfones are referred to hereinafter as sulfolanes. By the term "a sulfolane" as employed in the specification and claims is meant a structure containing four carbon atoms and a sulfur atom in a ring, the sulfur atom of this five membered heterocyclic ring having two oxygen atoms attached thereto. The structural formula of the simple unsubstituted sulfolane is:

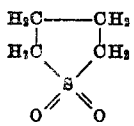

This compound has also been termed "thiacyclopentane - 1,1 - dioxide," "thiolane - 1,1-dioxide," "cyclotetramethylene sulfone" or "dihydrobutadiene sulfone."

The cyclic sulfones containing unsaturated carbon atoms in the ring are referred to hereinafter as "sulfolenes." By the term "a sulfolene" is meant a structure containing four carbon atoms and a sulfur atom in a ring, the sulfur atom having two oxygen atoms attached thereto, and two vicinal nuclear carbon atoms being joined together by an olefinic linkage. This compound has also been called "thiacyclopentene-1,1-dioxide. The single double bond in the sulfolene ring may be between any two adjacent carbon atoms. The structural formula of the simple unsubstituted 3-sulfolene is represented by the formula

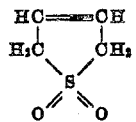

similarly the structure of the simple unsubstituted 2-sulfolene is represented by the formula

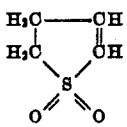

The generic terms "a sulfolane" and "a sulfolene" as employed herein furthermore comprise not only the compounds described above but also the substituted products thereof wherein one or more of the hydrogen atoms are substituted by an organic radical, preferably a substituted or unsubstituted hydrocarbon radical such as an alkyl, alkenyl, cyclo-alkyl, cyclo-alkenyl, aryl, aralkyl or aralkenyl group. The substituent groups directly connected to the nuclear carbon atoms of sulfolane, or sulfolene, may be further substituted, for example, by the replacement therein of a hydrogen atom by one or more halogen atoms such as chlorine, bromine, and fluorine.

Similarly "a sulfolanyl radical" is the monovalent radical resulting from the removal of a hydrogen atom from a nuclear carbon atom of "a sulfolane," and a "sulfolenyl radical" is the monovalent radical resulting from the removal of a hydrogen atom from a nuclear carbon atom of "a sulfolene."

The novel asymmetrical sulfolanyl ethers of the invention are represented by the following general structural formula

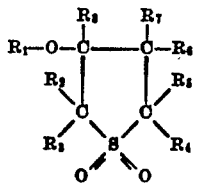

wherein $R_1$ represents a heterocyclic radical of a heterocyclic alcohol and the symbols $R_2$, $R_3$, $R_4$, $R_5$, $R_6$, $R_7$ and $R_8$ of the sulfolanyl radical represent the same or different atoms or groups such as hydrogen atoms, halogen atoms or organic radicals which are preferably substituted or unsubstituted hydrocarbon radicals, such as alkyl, alkenyl, cyclo-alkyl, cyclo-alkenyl, aryl, aralkyl or aralkenyl groups, or a hydroxyl group, an alkoxy group, e. g. the methoxy radical, the nitrile group, an amino group, an alkylamino group, an ester group, a halogen such as a chlorine, bromine or fluorine atom, etc.

The heterocyclic radical $R_1$ of the asymmetrical sulfolanyl ethers of the invention as exemplified by the above structural formula consists of the heterocyclic radical of a heterocyclic alcohol containing one or more heteroatoms, such as oxygen, nitrogen and sulfur, in addition to carbon, in the ring, and preferably having a total of from three to six atoms in the nucleus. Particularly useful compounds of the invention comprise those wherein the ether oxygen atom is connected directly to a nuclear carbon atom of the heterocyclic ring of the radical, $R_1$, or to a carbon atom in turn directly connected to a nuclear carbon atom of the heterocyclic ring of the radical, $R_1$. Included within the scope of the invention, however, are the asymmetrical sulfolanyl ethers wherein the ether oxygen atom is removed by more than one carbon atom, but preferably not more than four carbon atoms, from a nuclear carbon atom of the heterocyclic ring of the radical, $R_1$.

Asymmetrical sulfolanyl ethers of the invention comprise those wherein the heterocyclic radical, $R_1$, consists of a monoheteroatomic radical such as for example, furyl, dihydrofuryl, tetrahydrofuryl, furfuryl, dihydrofurfuryl, tetrahydrofurfuryl, thienyl, pyrryl, pyrrolidyl, benzofuryl, benzothiofuryl, indyl, isoindyl, indylidine, pyranyl, thiopyranyl, pyridyl, quinolyl, the monovalent radical of a polymethylene oxide, their alkyl substitution products in which at least one or more alkyl groups such as for example methyl, propyl, butyl, isobutyl, amyl, isoamyl, etc., or aryl, alkaryl, aralkyl groups, are directly connected to a nuclear atom of the heterocyclic ring, as well as their homologues and analogues. The substituent hydrocarbon groups may be further substituted, for example, by the replacement therein of one or more hydrogen atoms thereof by a halogen, such as chlorine, bromine, fluorine, or a hydroxyl, carbonyl, carboxyl group, etc.

Of the asymmetrical sulfolanyl ethers of the invention wherein the heterocyclic radical $R_1$ is monoheteroatomic, those wherein the heteroatom is oxygen and the ether oxygen is directly connected to a nuclear carbon atom of the heterocyclic ring or to a carbon atom in turn directly connected to a nuclear carbon atom of the heterocyclic ring are of particular value. Such compounds comprise those wherein the heterocyclic radical $R_1$ consists of, for example:

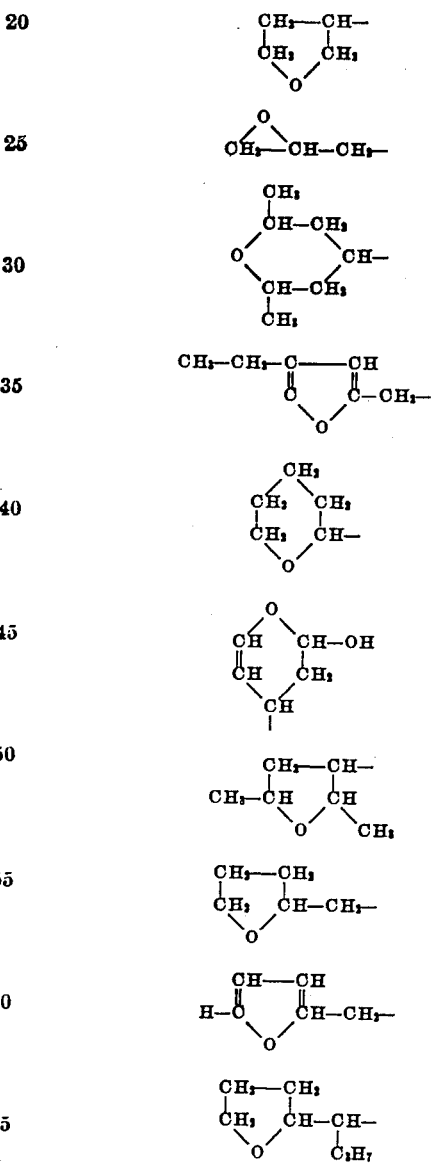

Other examples of asymmetrical sulfolanyl ethers of the invention comprise those wherein the heterocyclic radical $R_1$ is the heterocyclic radical of one of the following alcohols: furfuryl alcohol, the alkyl substituted furfuryl alcohols such as ethylfurfuryl alcohol, n-butylfuryl carbinol, the alkyl tetrahydrofurfuryl alcohols such as ethyltetrahydrofurfuryl alcohol, butyltetrahydrofurfuryl alcohol, propyltetrahydrofurfuryl alcohol, tetrahydrofurylethyl carbinol, omega-hydroxymethylfurfural, the hydroxy coumarones, the hydroxy coumarines, the hydroxy coumaronones, the hydroxy pyrones such as 4,6-dihydroxy-alpha-pyrone, the pyridine-methanols and pyridine-ethanols, the pyrrole alcohols such as 2,5-dimethyl-3-carbethoxy-4-hydroxymethylpyrrole, the alcohols of the pyrrolidine series, 1-methyl-2-beta-hydroxy-n-propylpyridine, 2-beta-hydroxy-n-propylpiperidine, beta-hydroxyindole, oxindole, alpha-pyridylethyl carbinol, gamma-hydroxytrimethylpiperidine; thioxanthydrol, dimethyl-alpha-thienyl carbinol, methylphenyl-alpha-thienyl carbinol.

The following compounds are given as illustrative of the novel asymmetrical sulfolanyl ethers of the invention, wherein the heterocyclic radical $R_1$ is monoheteroatomic:
3-ethylfurfuryl 3-sulfolanyl ether,
3-ethyltetrahydrofurfuryl 3-sulfolanyl ether,
4-n-butylfurfuryl 3-sulfolanyl ether,
4-butyltetrahydrofurfuryl 3-sulfolanyl ether,
3-tetrahydrofurylpropyl 3-sulfolanyl ether,
2-pyridylmethyl 3-sulfolanyl ether,
2,4,6-trimethyltetrahydropyran-4-yl 3-sulfolanyl ether,
2,3-epoxypropyl 3-sulfolanyl ether,
n-Propyl-alpha-furfuryl 3-sulfolanyl ether,
2,5-dimethyl-3-carbethoxy-4-pyrrylmethyl 3-sulfolanyl ether,
beta-Indolyl 3-sulfolanyl ether,
7-benzofuryl 3-sulfolanyl ether,
beta-Pyridylmethyl 3-sulfolanyl ether,
alpha-Dihydropyridyl 3-sulfolanyl ether,
5-methyl-2-thienylmethyl 3-sulfolanyl ether,
Methylphenyl-2-thienylmethyl 3-sulfolanyl ether.

The asymmetrical sulfolanyl ethers of the invention may be obtained by any suitable method. They are obtained, for example, by the reaction of a sulfolene of the above-identified class with a heterocyclic alcohol under the conditions set forth more fully hereinafter. Thus the asymmetrical sulfolanyl ethers above-described which contain a monoheteroatomic radical are obtained by reacting a sulfolene, for example 3-sulfolene, with a heterocyclic alcohol containing a monoheteroatomic ring. Examples of such suitable alcohols comprise, for example, any of the heterocyclic alcohols of the class exemplified by the heterocyclic alcohols listed above as containing a suitable monoheteroatomic ring.

Compounds of the invention wherein the radical $R_1$ of the above exemplary formula is a diheteroatomic ring comprise those wherein the heterocyclic radical $R_1$ consists, for example, of a radical such as one of the following: oxazolyl, isooxazolyl, thiazyl, imadazolyl, pyrazolyl, dioxyl, dioxolanyl, their alkyl substitution products in which at least one or more alkyl groups such as for example methyl, propyl, butyl, isobutyl, amyl, isoamyl, etc., or aryl, alkaryl, arylalkyl groups, are directly connected to a nuclear atom of the heterocyclic ring, their homologues and analogues. The substituent hydrocarbon groups attached to the nuclear atoms of the heterocyclic ring may be further substituted, for example, by the replacement of one or more hydrogen atoms thereof by a halogen such as chlorine, bromine, fluorine, or a hydroxy, carbonyl, carboxyl group, etc.

The asymmetrical sulfolanyl ethers of the invention wherein the heterocyclic radical $R_1$ of the above exemplary formula is a diheteroatomic ring and both of the heteroatoms are oxygen are illustrative of this novel group of compounds. These compounds comprise, for example, the asymmetrical sulfolanyl ethers of the above exemplary formula wherein radical $R_1$ consists of one of the following groups:

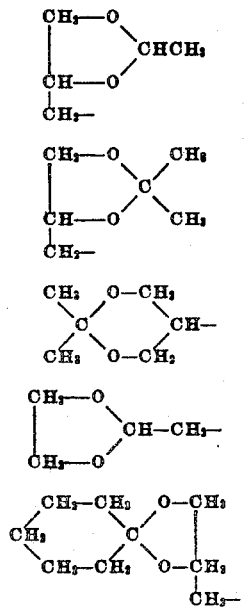

Examples of the asymmetrical sulfolanyl ethers of the invention wherein $R_1$ is a diheteroatomic radical are the following:

2,2-dimethyl-1,3-dioxolan-4-ylmethyl 3-sulfolanyl ether,
2-methyl-1,3-dioxolan-4-ylmethyl 3-sulfolanyl ether,
2,2-dimethyl-2-(1,3-dioxolan-4-yl) ethyl 3-sulfolanyl ether,
2-ethyl-1,3-dioxolan-4-ylmethyl 3-sulfolanyl ether,
2-para-dioxanylmethyl 3-sulfolanyl ether.

The ethers of the invention containing a diheteroatomic radical, $R_1$, are likewise obtainable by reacting a heterocyclic alcohol containing a diheteroatomic ring corresponding to the desired diheteroatomic radical, $R_1$, of the desired asymmetrical sulfolanyl ether, with a sulfolene, for example a 3-sulfolene. Thus the asymmetrical sulfolanyl ethers containing a diheteroatomic ring, of the preferred class, are obtained by reacting with a sulfolene a heterocyclic alcohol of the class exemplified by the 1,3-dioxolanemethanols such as 2,2-dimethyl-1,3-dioxolane-4-methanol; 2-methyl-1,3-dioxolane-4-methanol; 2,2-dimethyl-1,3-dioxolane-4-ethanol; 2-hydroxymethyl-1,3-dioxolane; 2-ethyl-1,3-dioxolane-4-methanol; 1,4-dioxane-ol-2-chloro-3; 1,4-dioxanediol-2,3; etc.

A particularly useful sub-class of compounds comprised in the novel asymmetrical sulfolanyl ethers of the invention because of the possession to an unusual degree of properties rendering them of particular value as plasticizers and additives in the production and treatment of highly polymeric substances such as, for example, polyvinyl chloride and cellulose acetate, are the asymmetrical sulfolanyl ethers containing a polyalkyl diheteroatomic six-membered ring, both heteroatoms in which are oxygen, obtained by reacting a heterocyclic alcohol having a polyalkyl dioxolane group.

The dioxolane group is represented by the general structural formula:

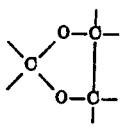

Heterocyclic alcohols exemplifying this preferred starting material in the production of the particularly valuable asymmetrical sulfolanyl ethers thereof comprise:

2,2-dimethyl-1,3-dioxolane-4-methanol,
2,2-diethyl-1,3-dioxolane-4-methanol,
2,2-dimethyl-1,3-dioxolane-4-ethanol, etc.

Compounds of the invention wherein the heterocyclic radical, $R_1$, of the above exemplary formula consists of a heterocyclic radical containing more than two heteroatoms in the nucleus of the heterocyclic radical are exemplified by those wherein the heterocyclic radical $R_1$ is a radical such as, for example: diazinyl, furazinyl, triazolyl, triazinyl, tetrazinyl, their substitution products wherein at least one or more alkyl groups such as for example methyl, ethyl, propyl, butyl, isobutyl, amyl, isoamyl, etc., or aryl, aralkyl, alkylaryl groups, etc. are directly connected to a nuclear atom of the heterocyclic ring, their homologues and analogues, etc. The substituent hydrocarbon groups attached to the nuclear atoms of the heterocyclic ring may be further substituted for example, by the replacement of one or more of the hydrogen atoms thereof by a halogen such as chlorine, bromine, fluorine, or a hydroxyl, carboxy, carbonyl group, etc.

Illustrative of the unsaturated cyclic sulfones which are reacted with the above-defined heterocyclic alcohols under conditions resulting in the production of the novel asymmetrical sulfolanyl ethers of the invention, comprise the following:

Sulfolene,
2-methylsulfolene,
2,5-dimethylsulfolene,
3-methylsulfolene,
2,4-dimethylsulfolene,
3,4-dimethylsulfolene,
4-methylsulfolene,
3-methylsulfolene,
3-ethylsulfolene,
2-hydroxysulfolene,
2-methoxysulfolene,
5-methylsulfolene,
2-ethylsulfolene,
2-methyl-3-ethylsulfolene,
2-methyl-3-propylsulfolene,
2-vinyl-3-sulfolene,
3-allyl-sulfolene,
2-vinyl-2-sulfolene,
3-methyl-4-chloro-3-sulfolene,
1-chloro-3-methyl-3-sulfolene,
3-tert-butyl-3-sulfolene,
3-phenyl-3-sulfolene,
3,4-diphenyl-3-sulfolene, and their suitable substitution products. The sulfones, as pointed out above, may be either the 2-sulfolenes or the 3-sulfolenes.

In the preparation of the novel sulfolanyl ethers by the reaction of a sulfolene with a heterocyclic alcohol of the defined class it is preferred to use a 3-sulfolene as a starting material. Production of the novel sulfolanyl ethers by the reaction of a sulfolene with a heterocyclic alcohol is represented by the following equation illustrating the preparation of 2,2-dimethyl-1,3-dioxolan-4-ylmethyl 3-sulfolanyl ether:

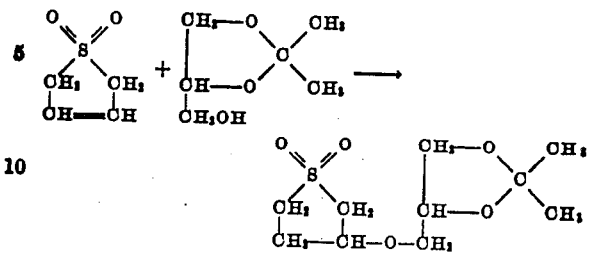

The reaction of the sulfolene with a heterocyclic alcohol of the well-defined class is preferably executed in an alkaline reaction medium. The alkalinity of the reaction medium is obtained by the presence of an alkaline substance. The utilization of such an alkaline reaction medium enables the attainment of the desired novel sulfolanyl ethers with excellent yields free of any substantial amounts of undesirable side reaction products. Suitable alkaline substances comprise in general the more basic compounds of the alkali metals as well as certain of the strong organic bases. Suitable basic compounds include trimethylbenzylammonium hydroxide, sodium hydroxide, potassium hydroxide, sodium carbonate, potassium carbonate, lithium hydroxide, and the like. Preferred members of this group are potassium hydroxide and sodium hydroxide. The alkaline agents may be used in amounts which may vary widely within the scope of the invention. In general, an amount between about 0.1% to about 3.0%, preferably about 1.0% based upon the weight of the cyclic sulfone employed, have been found satisfactory. They may be used as such or in the form of an aqueous solution, preferably in solutions containing from about 0.1% to about 40% by weight of basic alkali metal compound. Additional amounts of the alkaline agents may be added during the course of the reaction to maintain the alkalinity of the reaction mixture.

It is generally preferred to execute the reaction in the presence of a substantial excess of the heterocyclic alcohol. The heterocyclic alcohol in the reaction mixture may suitably range from about two to four mols and even more per mol of sulfolene present. The heterocyclic alcohols which are normally liquid may be diluted with suitable solvents while heterocyclic alcohols which are solid at temperatures of execution of the reaction are employed in the form of a solution in a solvent inert under the conditions of execution. Additional inert liquids are suitably added which are capable of functioning as diluents or in the control of temperature and flow. Buffering and stabilizing agents may also be added when needed to the reactants.

The temperature of execution of the reaction will vary, depending upon the particular reactants employed. In general, the maximum permissible temperature will be defined by the decomposition temperature of the sulfolene employed. In the case of 3-sulfolene this is in the range of about 120° C. The lower limit will generally depend to a substantial degree upon the temperature required to initiate the reaction. This temperature generally ranges from about normal room temperature or somewhat lower, for example 15° to 20° C., to about 40° C. A preferred operating temperature range comprises a temperature in the range of, for example, from about room temperature to about 80° C.

The reaction is executed advantageously at atmospheric pressure. Superatmospheric pressures up to for example about 500 pounds, and even higher, may however be resorted to.

Upon completion of the reaction the sulfolanyl ether is separated from the reaction mixture, which will generally include unreacted heterocyclic alcohol preferably added in excess to the charge, by any suitable means comprising such steps as, for example, distillation, washing, solvent extraction, filtration, and the like.

The reaction is executed in any suitable type of apparatus enabling intimate contact of the reactants and control of operating conditions. The process may be carried out in batch, semicontinuous or continuous operation. When continuous operation is resorted to, reactants continuously withdrawn from the reaction zone are preferably subjected to a substantially continuous product separating operation under conditions enabling the continuous recycling to the reaction zone of separated unreacted materials together with solvents and diluents when these are employed.

The following examples are illustrative of the invention:

*Example I*

2,2-dimethyl-1,3-dioxolan-4-ylmethyl 3-sulfolanyl ether was prepared by dissolving 8 grams of sodium hydroxide in 528 grams of 2,2-dimethyl-1,3-dioxolane-4-methanol. The resulting solution was maintained at a temperature of about 60° C. on a steam bath while small portions of 3-sulfolene were added slowly thereto. When 236 grams of 3-sulfolene had been added to the alkaline solution the mixture was maintained at a temperature of about 60° C. for a period of 48 hours. An additional 2 grams of sodium hydroxide were added to the reactants during the course of the reaction. Unreacted 2,2-dimethyl-1,3-dioxolane-4-methanol was distilled from the reaction products. The reaction product was then washed with isopropyl alcohol and solid impurities separated therefrom by filtration. A yield of 34% (based upon 3-sulfolene charged) of 2,2-dimethyl - 1,3 - dioxolan-4-ylmethyl 3-sulfolanyl ether having the following structure was obtained:

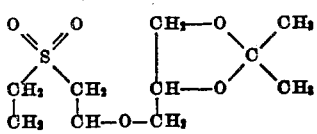

The normally liquid product comprising the ether thus obtained distilled in the temperature range of from 152.8° C. to 155.4° C. at a 1 mm. pressure. The sulfur content thereof analyzed 13.3% (calculated 12.8%). The ether was soluble in water and only slightly soluble in kerosene.

*Example II*

Tetrahydrofurfuryl 3-sulfolanyl ether was prepared by dissolving 60 grams of sodium hydroxide in 552 grams of tetrahydrofurfuryl alcohol on a steam bath. To the resulting solution there was slowly added 319 grams of 3-sulfolene while maintaining the resulting mixture at a temperature in the range of from 18.5° C. to about 33° C. Upon completion of the 3-sulfolene addition the resulting mixture was stirred for a period of 48 hours at room temperature. Unreacted alcohol was distilled from the reaction product. Tetrahydrofurfuryl-3-sulfolanyl ether, having the formula of:

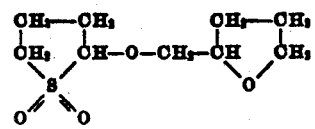

was obtained in an amount equal to 93.4% conversion (based upon conversion of 3-sulfolene charged to the ether). The product distilled in the temperature range of from 180 to 185° C. at 3 mm. pressure. Upon analysis the ether was found to have a sulfur content of 14.55% (theoretical 14.6%). The ether had a specific gravity of $d_4^{20}$ 1.2579 and a refractive index of $n_D^{20}$ 1.4973; was easily soluble in water and substantially insoluble in hydrocarbons.

*Example III*

1,3-dioxolan-2-ylmethyl 3-sulfolanyl ether is prepared by dissolving 0.2 mol of sodium hydroxide in 4 mols of 2-hydroxymethyl-1,3-dioxolane on a steam bath and slowly adding 2 mols of 3-sulfolene to the alkaline solution. The resulting mixture is allowed to stand for 24 hours at a temperature of 55° C. When the reaction is completed the reaction mixture is distilled at reduced pressure to effect the removal of unreacted alcohol from the 1,3-dioxolan-2-ylmethyl 3-sulfolanyl ether.

*Example IV*

Normal-propyl-alpha-furfurylcarbinyl 3 - sulfolanyl ether is prepared by dissolving 0.3 mol potassium hydroxide in 3 mols of n-propyl-alpha-furfurylcarbinol on a steam bath. To the resulting solution there is slowly added 1 mol of 3-sulfolene. The mixture is maintained at a temperature of from 45 to 65° C. for a period of 18 hours. When the reaction is completed the reaction mixture is distilled to remove unreacted alcohol from the n-propyl-alpha-furfurylcarbinyl 3-sulfolanyl ether.

*Example V*

Beta-indolylmethyl 3-sulfolanyl ether is prepared by slowly adding 1 mol of 3-sulfolene to a solution of 0.2 mol of sodium hydroxide in beta-hydroxy indole. The reaction mixture is maintained at a temperature of from 40 to 60° C. for a period of about 12 hours. When the reaction is complete the reaction mixture is distilled under reduced pressure to recover beta-indolylmethyl 3-sulfolanyl ether.

We claim as our invention:

1. 2,2-dimethyl-1,3-dioxolan - 4 - ylmethyl 3-sulfolanyl ether.
2. Tetrahydrofurfuryl 3-sulfolanyl ether.
3. The compounds of the general formula

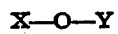

wherein X is dimethyl-substituted dioxacyclopentylcarbinyl and Y is the sulfolanyl radical.

4. The compounds of the general formula

wherein X is dimethyl-substituted dioxacyclopentylcarbinyl and Y is sulfolenyl radical.

5. The compounds of the general formula

wherein X is alkyl-substituted dioxacyclopentylcarbinyl and Y is the sulfolanyl radical.

6. The compounds of the general formula

wherein X is dioxacyclopentylcarbinyl and Y is sulfolanyl radical.

7. The compounds of the general formula

wherein X is dioxacyclopentylcarbinyl and Y is a radical of the group consisting of the sulfolanyl radical and the sulfolenyl radical.

8. The compounds of the general formula

wherein X is tetrahydrofurfuryl and Y is the sulfolanyl radical.

9. The compounds of the general formula

wherein X is oxacyclopentylcarbinyl containing from one to two oxygen atoms wherein each oxygen valence bond is attached to a nuclear carbon atom and Y is a radical of the group consisting of the sulfolanyl radical and the sulfolenyl radical.

10. The compounds of the general formula

wherein X is a member of the group consisting of oxacyclopentylcarbinyl containing from one to two oxygen atoms and wherein each oxygen valence bond is attached to a nuclear carbon atom and alkyl substituted-oxacyclopentylcarbinyl containing from one to two oxygen atoms wherein each oxygen valence bond is attached to a nuclear carbon atom and Y is a radical of the group consisting of the sulfolanyl radical and the sulfolenyl radical.

RUPERT C. MORRIS.
JOHN L. VAN WINKLE.

REFERENCES CITED

The following references are of record in the file of this patent:

UNITED STATES PATENTS

| Number | Name | Date |
|---|---|---|
| 2,291,798 | Delfs | Aug. 4, 1942 |
| 2,357,344 | Morris et al. | Sept. 5, 1944 |
| 2,360,860 | Morris et al. | Oct. 24, 1944 |